Dec. 2, 1958
R. M. DANIEL
2,862,770
GAS LIFT OPERATION
Filed July 19, 1951
2 Sheets-Sheet 1
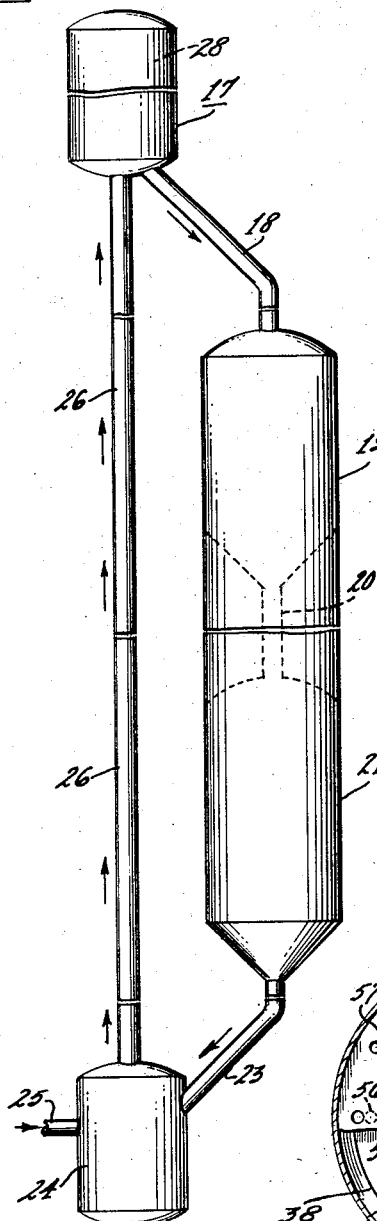
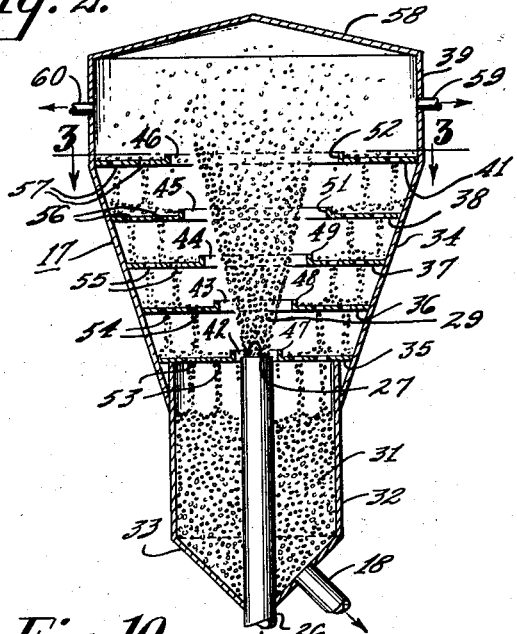
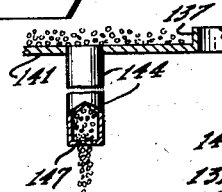
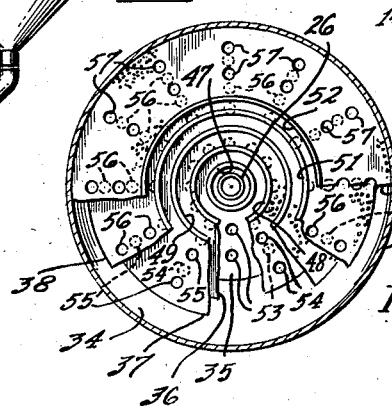
INVENTOR
Richard M. Daniel
BY
ATTORNEY

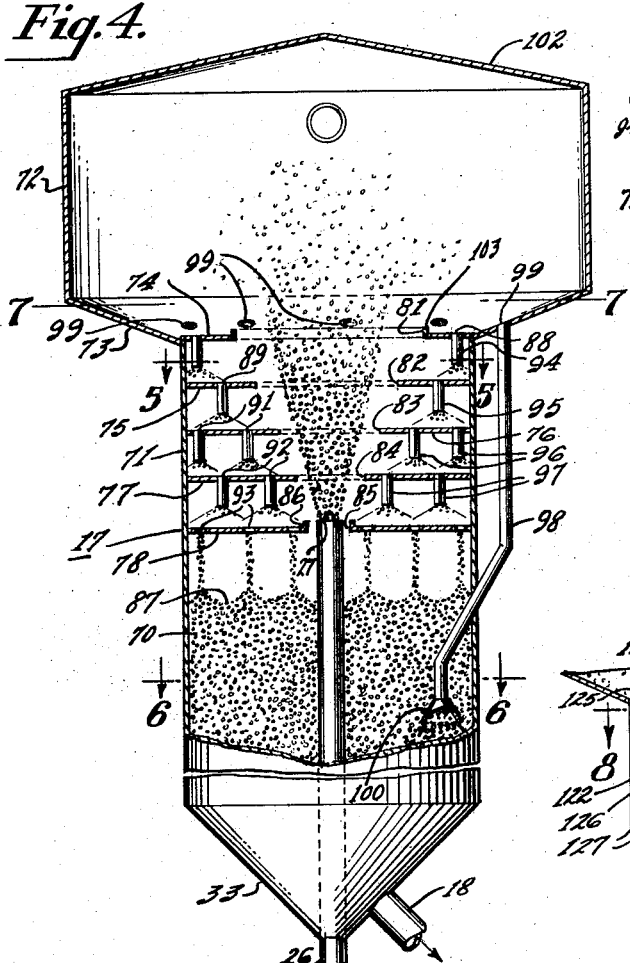

United States Patent Office 2,862,770
Patented Dec. 2, 1958

2,862,770

GAS LIFT OPERATION

Richard M. Daniel, Springfield, Pa., assignor to Houdry Process Corporation, Wilmington, Del., a corporation of Delaware Application July 19, 1951, Serial No. 237,625

8 Claims. (Cl. 302—17)

This invention relates to a processing system wherein free-flowing particles, especially granules or pellets of relatively frangible, solid material such as contact materials used for instance in chemical treating operations, are continuously moved through a substantially closed circuit which includes: (a) a downflow pass, wherein the granular material travels through at least one processing zone in which it participates in a processing step; (b) an upflow pass, which receives the free-flowing solids from the downflow pass and wherein they are elevated by a pneumatic lift; and (c) a separating or disengaging zone above the upflow pass and into which the solids-fluid mixture emerging from the lift discharges for the solids to be separated from the fluid to return to the downflow pass. In the disengaging zone the separated solids, after having been raised an appreciable height until the momentum imparted to them by the lifting fluid is overcome by the pull of gravity, then fall through a considerable distance on their return to the downflow pass and are thereby exposed to the possibility of undesirable amount of attrition upon falling against the disengager bottom or against previously fallen solids thereon.

The invention involves a modification of the operation of such processing systems and of the method of handling such solids particularly in the separating or disengaging zone, whereby the falling granular solids are restrained against developing high enough velocity to result in disadvantageously high impact when the solids meet those which had fallen before them. Also included is the applicable improved apparatus.

The systems embracing the method and apparatus of the invention are useful in such chemical operations where, for example, granular solids or pellets are relied on for heat exchange, to furnish or remove heat from a fluid, gas (whether single gas or mixture, a vapor, or gas-vapor mixture) or liquid, as heat for distillation or fractionation or cooling for condensations, or to supply heat to the fluid to cause chemical reaction, for example, in thermal cracking of petroleum or its fractions; and particularly in operations wherein such granules or pellets act as contact catalyst in various types of hydrocarbon conversion reactions including cracking processes. The method and apparatus of the invention are especially advantageously effective in those systems, in the downpass of which the granular solids travel as a downwardly moving, non-turbulent and relatively compact bed through the reactor zone, and then continue on in the circulation. The granular solids with which this invention is concerned are those having an average particle size of 14 mesh or larger, and include the typical cast pellets, spherical bead-form materials or other regular or irregular solid shapes generally in the size range of 2 to 5 mm. in their larger dimension.

While not necessarily restricted to any specific chemical or physical treating operation, the invention conveniently can be described in relation to its inclusion in a system wherein such granular solids comprise hydrocarbon conversion catalyst and are recirculated through a relatively closed cycle, passing downwardly as a non-turbulent bed (as described) through a reaction zone and to and through a regeneration zone and from it to a pneumatic lift discharging into a disengager wherein the pull of gravity finally overcomes the momentum of the solids leaving the exit end of the lift, and they then fall to the bottom of the disengaging zone to return to the downpass to retrack the circuit just completed. Such catalyst recirculation systems occur in various installations of petroleum cracking processes currently operating in this country.

Figures 1 and 2 in "New Houdriflow Installations Employ Modified Design," pages 170–175 of the September 1950 issue (volume 29, No. 9) of "Petroleum Refiner" show such a closed cycle in a petroleum-cracking installation with a reactor above a regenerator from which the regenerated catalyst passes to a lower lift hopper and by a pneumatic (gas) lift is raised to the disengager (upper lift hopper), to be fed again on its downpass to the reactor, and so on again through the cycle. Highly desirable economies are obtained by the advantage of gravity flow resulting from locating the reactor over the regenerator, and the upper lift hopper at a level above reactor. The accompanying extended heights of such installations necessitate raising the catalyst pellets or beads greater distances than were required by other and earlier installations employing side by side arrangement of the reactor and kiln. Pneumatic lifts have been found more efficient and economical in power requirements and subject to less maintenance expense than bucket elevators for such heights. It is not unusual for the granular catalyst to be raised in the range of about two hundred feet by the gas lift from the lower hopper to the upper hopper, and commonly a distance of at least one hundred and fifty feet, and quite generally higher. Systems possibly employing shorter lifts are also within the scope of the present invention.

The quantity of catalyst circulated, although not limited to this as a minimum, ordinarily is not under about one hundred tons per hour and it is not unusual for the catalyst circulation load to run as high as two hundred and fifty or three hundred tons per hour, and sometimes higher, as noted from the "Petroleum Refiner" article. In elevating such quantities of catalyst in concentrations averaging about one to two pounds and at times more per cubic foot in lift pipes of practical diameter, the catalyst may reach an average velocity at the discharge or exit end of the lift of at least thirty and usually about forty feet per second or higher. The catalyst pellets emerging from the exit end of the lift at such velocities, unless suitable means are provided for deceleration, may be propelled as much as twenty, and often as much as thirty or more feet above the top of the lift before they begin to drop.

To enable the catalyst to travel in its downpass through the reactor in a sufficiently compact mass, it is necessary to maintain on the bottom of the disengager (the upper lift hopper) some depth of catalyst accumulation which can operate as a surge bed. When the level of the catalyst surge bed in the disengager hopper is relatively low, as will be the case in normal operation, the discharge end of the lift extends many feet above the top of the surge bed. Accordingly, the disengaged catalyst all too often will drop about thirty feet and more by the time it has completed its fall on contacting the top of the surge bed. Obviously, the impact on each individual pellet is considerable after such a fall and accordingly there is presented a real concern over the problem of the extent of attrition of the catalyst or other frangible pellets or granules.

These and other problems encountered in disengaging or separating such granular solids from the solids-gas mixture stream discharging from a pneumatic lift into what might be termed an otherwise hollow or empty disengaging zone or disengager are efficiently overcome by the method and applicable apparatus of the invention. Speaking broadly, the invention as to process involves the method of effectively reducing the maximum free fall velocity attainable by the descending granular solids by the end of their drop after disengagement from the lift fluid and thereby significantly reducing the force of their impact against the bottom of the disengaging zone, and likewise markedly lowering the possibility of attrition damage, which method comprises interrupting or breaking the fall of the disengaged granular solids by temporarily stopping them on at least one, from nearly horizontal, to horizontal, intermediate level or surface in their entire descent from the summit of their rise from the lift, and before reaching the bottom of the disengaging zone, and letting the thus interrupted solids descend from such surface or surfaces without freely falling for any significant distance between levels and without contacting any surface other than a layer of catalyst. Preferably the falling solids are thus interrupted in a plurality of such surfaces in sequence each at a lower level than the preceding one, and having through each of such surfaces discharge ports or outlets within its bounds for solids to descend from it. In another advantageous embodiment, also involving a plurality of such surfaces, interrupted solids descend from the topmost interrupting surface in one or more relatively confined streams, at least usually comparatively compact, directly to the surge bed level.

Any such surface at which the disengaged solids are temporarily detained or stopped advantageously is located outside of the path of the rising stream of granules discharging from the lift and at the same time within the path of any granular solids that may fall off or past any such detaining surface or surfaces thereabove. At least usually for most installations, present considerations indicate it to be advantageous to interrupt or break the fall of the solids by stopping or detaining them in sequence on a plurality or series of detaining surfaces or trays each at a different level intermediate about the top of the lift and the summit reached by the solids emerging from it. In this mode of the process of the invention, after temporary interruption of solids on the first detaining surface that the solids encounter in falling, the solids drop off in a plurality of streams, each through a separate one of a plurality of apertures located within the bounds of that surface, and with or without passing through a short conduit depending from the aperture, to the next lower detaining surface and after temporary interruption on it, continue on similarly to each lower one in the series and finally drop off from the lowermost of them to the bottom of the disengager zone.

The various features and advantages of the method of the invention and of the practice of it as well as of the nature and operation of the apparatus of the invention can be more readily recognized and understood when described in relation to the accompanying drawings wherein: Figure 1 is a generalized representation in foreshortened elevation, of a catalytic hydrocarbon conversion (e. g. catalytic cracking) system, including a pneumatic lift feeding into a disengager internally equipped according to the apparatus of the invention and to enable the operation of the method of the invention as part of a continuous cycle involving circulation of catalyst granules or pellets; Figure 2 is a vertical section through the middle of a modification, embraced by the invention, of the disengager of Figure 1; Figure 3 is a horizontally transverse section along the line 3—3 of Figure 2 and looking in the direction of the arrows; Figure 4 is a foreshortened vertical section through the middle of a different modification of the disengager; Figure 5 is a horizontally transverse section along the line 5—5 of Figure 4 and looking in the direction of the arrows; Figure 6 is a horizontally transverse section along the line 6—6 of Figure 4 and looking in the direction of the arrows; Figure 7 is a vertical section through the middle of a modification of the lower or narrower portion of the disengager of Figure 4 (from about below the line 7—7 of Figure 4); Figure 8 is a horizontally transverse section along the line 8—8 of Figure 7 and looking in the direction of the arrows; Figure 9 is a foreshortened vertical section through the middle of the disengager of Figure 1; and Figure 10 is an enlarged view, partly in broken, foreshortened section, of a part of one of the interrupting surfaces or trays of Figure 9, and showing a so-called downcomer from the aperture on that part.

In the system as represented in Figure 1, molded pellets or bead (e. g. spherical) catalyst 15 (see Figure 9) flows downwardly from the catalyst surge bed 16 at the bottom of the lift disengaging hopper (or disengaging chamber, or merely disengager) 17 by gravity through the reactor seal leg 18 into the reactor 19 and through it as a downwardly moving, compact, non-turbulent bed, then through the reactor-and-kiln-connecting seal leg 20 into the regenerator kiln 21 and subsequently through the kiln outlet seal leg 23 into the lift engaging hopper 24 forming a bed therein. Lift gas entering the hopper 24 through the lift gas feed line 25 impels the catalyst from the bed of it in the hopper 24 into the lift pipe 26 through which the catalyst is elevated as a mixture of solid pellets in lift gas (or solids-fluid mixture or solids-gas mixture) to the discharge or exit end 27 (see Figure 9) of the lift pipe 26 into the disengaging zone 28 of the disengager 17, for the solid catalyst 15 to be disengaged or separated from the lift gas to descend in stages ultimately to join accumulated earlier separated catalyst in the catalyst surge bed 16 in the lowermost portion of the disengaging hopper 17. The return of the disengaged catalyst to the catalyst surge bed 16 in the bottom of the hopper 17 completes one cycle in the continuous circulation in the catalytic hydrocarbon conversion system. The present invention deals particularly with improvements in handling the catalyst in disengager 17.

Additional details of such a cycle in such a conversion system can be developed from the article referred to above in "Petroleum Refiner" and in an article entitled "Houdriflow: New Design in Catalytic Cracking," in the January 13, 1949, "Oil and Gas Journal" at page 78, and in part also in "The 'T. C. C.' Catalytic Cracking Process for Motor Gasoline Production," by R. H. Newton, G. S. Dunham and T. P. Simpson, in "Transactions of the American Institute of Chemical Engineers," volume 41, page 215, April 25, 1945, and in articles cited in it.

Now, referring back to the drawings, while Figure 9 shows a disengager of the same general outline as that of disengager 17 of Fig. 1, there is no restriction to that outline for it can vary to conform to any particular embodiment incorporating any specific modifications from the apparatus in its broadest form or for carrying out the process of the invention with any specific variation from it in its generic form. Considering then Fig. 2, it shows a particular embodiment of disengager 17 comprising (*a*) a surge bed section or bin 31 having a cylindrical main body portion 32 communicating with an inverted conical hopper section 33 for feeding granular solids to the reactor through the reactor seal leg 18, the end portion of the lift 26 extending preferably centrally through the surge bed bin 31 to about the top of it, (*b*) an inverted frusto-conical, intermediate disengaged solids fall-breaking section 34 fitting on top of, and communicating, in a manner described below, with the surge bed section 31, and including (*c*) a number of falling-solids-detaining or interrupting trays 35, 36, 37 and 38 of the nature hereinafter described, and topped off by (*d*) a cylindrical section 39 receiving the highest rising solids and communicating with the frusto-conical, intermediate fall-breaking section 34 through a falling-solids-detaining surface or tray 41 serving, as it were, as a dividing surface between the two sections 34 and 39. The tray 41 also serves, in a measure, as the base of the section 39 and at the same time as the upper and larger base of the inverted frusto-conical section 34.

Each of the detaining surfaces or trays 35, 36, 37, 38 and 41 has a large, preferably centrally positioned aperture 42, 43, 44, 45 and 46 respectively and concentric with one another, each aperture being surrounded by its respective short solids-restraining or retaining dam or rim 47, 48, 49, 51, and 52 respectively. Reasonably symmetrically located over the extent at each of the trays 35, 36, 37, 38, and 41 is a plurality or set of small apertures 53, 54, 55, 56, and 57 respectively, with these smaller apertures in the set on each of these trays being staggered in location in relation to the location of those in the tray below it, as seen in Fig. 3. If desired, the apertures from tray to tray may be circumferentially offset from one another instead of or in addition to their being radially staggered.

In operation of the disengager 17 of Figures 2 and 3, the solids-fluid mixture emerging from the exit end 27 of the gas lift 26 continues upwardly, under the momentum imparted to it by the lift gas, toward the top 58 of the disengager and the stream of solids flares out substantially symmetrically in all directions with its outermost bounds at least usually at an angle of about 7-15 degrees to the axis of the rising stream. The diameters of the concentric large apertures in the trays 35 through 38 and 41 are such that a line drawn through the intersection of the top edge of the rim of each of them forms an angle to the axis of the stream of usually from over seven degrees to around 15 degrees. Thus these trays under suitable operating conditions will be out of the path of the rising stream of solids. Also any quite small amount of solids that undesignedly might drop over the rim of a tray into its large central opening will fall similarly out of the path of the rising stream. When the planned operating conditions for a new installation may necessitate it, the diameters of those apertures can be adjusted to form whatever different such angle is needed to meet these ends.

When the momentum of the rising solids is spent, they spread out more widely and shower downwardly in a form quite like that of an open umbrella of the granular solids falling under the influence of gravity. Those solids that are impelled above the level of detaining surface or tray 41 (i. e. those that are expelled from the lift higher than the others), having reversed their direction and started to fall, land on tray 41 and initially accumulate in a layer of connected mounds over the surface of tray 41 (because the solids that reach the apertures 57 spill through them to detaining tray 38). Depending upon the discharge capacity of the apertures 57, a greater or less proportion of the solids may also spill over the rim 52 to the tray next below.

Catalyst granules, spilling through the overflow apertures 57 of tray 41 together with additional solids from mixture stream 29, which are not impelled high enough, or do not fall outwardly far enough, to reach tray 41, and including the little that might at times spill over retaining rim 52 of tray 41, land on detaining tray 38 and accumulate on it as a layer of connecting mounds surrounding its overflow apertures 56 and spill through them to the next lower detaining tray 37. All this occurs in the same way as the landing, accumulation, and spilling off of catalyst granules as described in relation to tray 41.

Similarly, catalyst granules spilling through apertures 56 of tray 38 and those from stream 29 that do not rise high, or outwardly, enough to reach tray 38 and what little might at times roll over its retaining rim 51, land and accumulate on, and spill through the overflow apertures 55 of detaining tray 37 to the next lower tray 36. Then stepwise the same occurs to the solids in relation to solids-detaining trays 36 and 35. Finally, the spillage through overflow apertures 53 of tray 35 and any solids that roll off of its retaining rim 47 and also any from stream 29, that did not reach tray 36, drop to the accumulated catalyst in the surge bed bin 31. From the lower part of the latter the catalyst granules enter the seal leg 18 and thereby start off again on the downflow pass of the cycle in the continuous circulation system. The lifting gas from which the solids have been separated is discharged, by a series of gas outlets such as 59 and 60, from the upper part of the topmost solids fall-breaking section 39.

The embodiment shown in Figures 4, 5, and 6 is fundamentally like the one of Figures 2 and 3, differing from it in three ways that will be readily recognized. As seen in Figure 4, the surge bed bin 70 and the intermediate solids fall-breaking section 71 are of the same diameter and thus have a common outer wall. The topmost fall-breaking section 72 has a much larger diameter, approaching, but not fixed, at twice that of the lower section 71 (the ratio of which will vary somewhat by the selected operating conditions including the height the solids need to be elevated for return to the reactor), and communicates with, and is joined to, the lower section 71 conveniently by an inverted frusto-conical bottom 73. The intermediate (or lower) fall-breaking section 71 includes a series of horizontal, vertically spaced apart falling-solids-detaining or -interrupting trays 74, 75, 76, 77, and 78, with the first of them advantageously positioned at the level of the junction of the lower and the topmost (or upper) fall-breaking sections 71 and 72.

Just as in the trays 35 through 38 and 41 of the embodiment of Figures 2 and 3, each of these trays 74 through 78 has a comparatively large, preferably centrally positioned aperture 81, 82, 83, 84, and 85 respectively, and concentric with one another. The lowermost 81 of them has a diameter conveniently sufficiently greater than that of the exit end 27 of the lift pipe 26 to enable such little amount of solids that might spill over the top of its restraining or retaining rim 86 to avoid jamming between rim 86 and lift pipe 26 and to drop to the top of surge bed 87. Also reasonably symmetrically distributed over each individual one of the trays 81 through 85 is a set or plurality of small overflow apertures 88, 89, 91, 92, and 93 with the location of them on each tray staggered in relation to the location of those in the tray below it, as seen from Fig. 5. From each overflow aperture, except those of the lowermost tray 78, there depends a short down-leading conduit briefly called a downcomer (identified respectively by numerals 94, 95, 96, and 97) shorter than the distance between adjoining trays. A series of long downcomers 98 depend from a ring of apertures 99 in the bottom 73 of fall-breaking section 72 and extend exteriorly of the wall of lower section 71 and pass through the wall of surge bed bin 70 preferably at a level below the top of surge bed 87 and terminate within the surge bed advantageously in an inverted funnel delivery end 100. The ring of apertures 99 is located advantageously in the lower half of bottom 73 of fall-breaking section 72 and concentric with the junction of bottom 73 with wall 71 which is thus encircled also by the long downcomers 99.

While the disengager of Figures 4, 5 and 6 differs further from that of Figures 2 and 3 by the inclusion of the two types of downcomers 94 through 98, except for explanation of how they function, these disengagers operate fundamentally similarly. In the Figure 4 modification, that portion of the solids that is discharged from the lift toward the roof 102 of upper fall-breaking section 72 and carried higher than the rest discharging with the solids-gas mixture stream drops on, and rolls down, the inclined bottom 73 of the upper section 72. Part of these catalyst granules spills into apertures 99 and down through the downcomers 98, and the rest rolls on to falling-solids-detaining tray 74, and stopped by its restraining rim 103, accumlates, together with disengaged granules landing from the stream directly on tray 74, in a layer of connected mounds and rolls down their slopes through the apertures 88 into, and travels down through, the downcomers 94. From thereon the disengagement of, and descent of the disengaged, catalyst in sequence from tray to tray down the series of fall-breaking trays 74 through 78 parallel what occurs in the earlier described embodiment. As in it, the granules finally accumulate in the surge bed 87 in its bin 70. The difference is that an installation of the later described modification can have its number of tray apertures and downcomers and their respective diameters so adjusted, for the granules load to be handled, that the mounds will accumulate on the trays and build up to the bottoms of the downcomers to have the catalyst travel through them at least as a relatively compact, descending column. Thereby, at least down substantially the entire height of fall-breaking section 71, any chance of dropping impact on the granules can be practically avoided. Moreover, by increasing the diameter of the downcomers (and of their overflow apertures) and/or the number of apertures and their downcomers progressively from tray 74 down to to tray 78, there will be remarkably little or no spilling of catalyst over the restraining rims, or even over merely the edges at the larger concentric, central apertures.

Inclusion of the long downcomers 98 enables reducing in part the load of descending granules handled through the lower section 71, by by-passing directly to surge bin 70 that portion of the disengaged solids landing on bottom 73 that spills down these downcomers. By selecting the suitable number of, and diameter for, the long downcomers, the travel through them can be adjusted for the particular installation to have the granules descend in a relatively compact, downwardly moving column, especially if their delivery ends terminate about at the top surface, or better still within the body, of the surge bed. In the latter case, use of the inverted funnel discharge end 100 facilitates emergence of the descending granules into the body of the surge bed.

The structure of any installation is not restricted to the embodiments already described so long as the various changes in design function within the generic character of the invention. For example, the part of the embodiment of Figure 4 below a line 7—7 through the bottom 73 of its upper fall-breaking section 72 can be modified to have a different relationship between the long downcomers and the fall-detaining trays, as shown in Figures 7 and 8. In these latter, solids-detaining trays 105, 106, 107, 108, with their centrally located, concentric apertures 109, 111, 112, and 113, each respectively of greater diameter than the one below it, are supported horizontally at their outer peripheries from a vertical cylinder 114 which also encloses the upper portion 115 of the surge bed and is in turn supported on the upper end of an open-ended frusto-conical bottom 116. The vertical cylinder 114 and its frusto-conical bottom 116 are suitably supported within, and uniformly spaced away from, the inner side of an enclosing-cylinder 117, and form with it a cylindrical downcomer annulus 118, the upper end of which opens into the topmost or upper fall-breaking section 72 (not shown), the inclined bottom 73 of which is supported from the upper end of enclosing cylinder 117. The lower end of the latter is closed by an inverted conical bottom 33 of the surge tank, through which the flared top portion 119 of the lift pipe 26 extends with its exit end 27 about at the level of, and encircled by, tray 108. The annulus 118 is preferably of such width as to pass the major portion of the solids therethrough as a compact annular column, the remainder passing through the opening in tray 105.

Reasonably symmetrically located over each of the trays 105, 106, 107, and 108 is its corresponding set of overflow apertures 121, 122, 123, and 124, with those in each tray staggered as to those in the tray below it, and with a corresponding short downcomer 125, 126, and 127 depending from each of the first three sets of apertures respectively.

Operation of the disengager of Figures 7 and 8 parallels that of Figures 4–6, with the exception that most of the granular solids that land and accumulate on the sloping bottom 73 of upper fall-breaking section 72 roll off the junction of bottom 73 with enclosing wall 117 and pass down through the cylindrical downcomer annulus 118 to the lower portion 129 of the surge bed. The area between the inverted frusto-conical bottom 116 and enclosing wall 117 provide an inverted funnel-like discharge end to the annulus downcomer 118 thereby facilitating emergence of the solids into the surge bed.

As solids leave the lower portion 129 of the surge bed on a new downpass through reactor seal leg 18, solids descend toward the latter in the lower portion of the surge bed and thereby enable solids to move into it not only from the annulus downcomer 118 but also from the upper portion 115 of the surge bed where the remainder arrives from the series of falling-solids-detaining trays and their associated short downcomers.

Figure 9 shows a further embodiment of disengager of an outline conforming to disengager 17 of Figure 1. This Figure 9 embodiment has its detaining trays 131, 132, and 133 with their respective central-located, concentric, rising stream apertures 134, 135, and 136 and restraining rims 137, 138, and 139 and symmetrically arranged overflow apertures 141, 142, and 143, staggered as to those in the tray below respectively, and their corresponding downcomers 144, 145, and 146. Operation of the disengager of Figure 9 parallels that of Figures 2 and 3 except for the downcomers in the Figure 9 embodiment, each of which has a restricting flange 147 at its discharge end to facilitate the building up of a compact downwardly moving column of solids in the individual downcomer and thereby cut down and even eliminate free fall through it. It will be understood that the flanges 147 are not limited to use with the particular modification of Figure 9, but may be employed if desired in other of the embodiments illustrated in the drawings.

The horizontal falling-solids detaining trays of the various embodiments of the apparatus of the invention by enabling the accumulation and maintenance of a layer of solids on the individual trays is a decided advantage by reducing to a minimum and practically eliminating the prospect of falling solids landing on metal or other hard structural parts, and providing for falling solids to contact substantially only other for the time being relatively stationary granular solids which present the further advantage of yielding spacially to impact from the landing disengaged granular solids. Provision of the retaining rims on the various trays, although not mandatory nor critical, is helpful toward the end just described. The various possible changes in individual parts mentioned in relation to individual embodiments are also possible with the corresponding parts of the other illustrated as well as possible modifications.

The method and apparatus of the invention are not confined to a disengager merely of cylindrical cross-section as in the illustrative drawings, nor to one serving merely a single lift (as illustrated), but are applicable also to one serving a plurality of lifts. They are especially advantageously applicable to handling granular solids or pellets of at least all held on a sixty mesh screen or larger, and often of the order of all held on a fourteen mesh screen and somewhat larger. They can be coarse and irregular or of uniform shape, such as molded cylindrical pellets or spherical beads, as commonly seen in hydrocarbon conversion catalysts and other contact masses used in the compact moving bed systems. Their diameter or largest dimension can be at least about one millimeter and up to say fifteen millimeters, and preferably between two and eight millimeters, and advantageously between about two and five millimeters.

While the invention has been described in relation to certain specifically illustrated embodiments of it, it is understood that many substitutions and variations may be made in it within the range of the appending claims that are intended also to cover equivalents of the illustrative embodiments.

What is claimed is:

1. In a system circulating granular solids comprising an upright gas-lift conduit through which the granular solids are impelled upwardly by lift gas and an enlarged disengager vessel into which said conduit discharges solids and gas, the improvement which comprises a series of nearly horizontal to horizontal trays in said disengager vessel, at least one of which trays is located above the discharge outlet of the lift conduit, the inner edges of said trays being spaced outwardly from the axis of the lift conduit and out of contact with the rising cone of solids discharged from said conduit, each of said trays being provided with spaced apertures in the bottom and within the bounds thereof permitting passage of solids therethrough.

2. The improvement as defined in claim 1 characterized in that a plurality of trays are located at successive levels above the discharge outlet of the lift conduit and the spaced apertures in the trays so located are staggered with respect to the apertures in the adjacent tray.

3. The improvement as defined in claim 2 wherein each of the apertures in the trays located above the discharge outlet of the lift conduit is provided with a short downcomer, the lower end of each downcomer being spaced from the surface of the next adjacent tray below at a distance such that a heap of discharged solids is formed at the discharge outlet of said downcomer limiting free flow of solids through said downcomer and causing such solids to flow through said downcomer as a relatively compact column and at a rate determined by the rate of removal of solids from said heap.

4. In a system circulating granular solids comprising an upright gas-lift conduit through which the granular solids are impelled upwardly by lift gas and an enlarged disengager vessel into which said conduit discharges solids and gas, the improvement wherein said disengager vessel is provided with an upper flared out section of larger diameter than the lower section therebelow and providing at the juncture of said sections a solids-retaining surface, nearly horizontal to horizontal annular trays in the lower section, the lowermost tray in said section being spaced from the bottom of the vessel to provide a free surge space between said lowermost tray and said bottom to retain a bed of granular solids in said space, a discharge outlet in the lower end of said vessel for withdrawing granular solids from said bed, discharge ports in said trays for passing solids therethrough to a tray next below and from the lowermost tray to the surface of said bed, and means for passing granular solids from said solids-retaining surface at said juncture to within said bed at a level below the upper surface of said bed.

5. Apparatus as defined in claim 4 wherein said means for passing granular solids from said solids-retaining surface comprises a series of spaced conduits having openings through said surface, the lower ends of said conduits being of enlarged diameter to facilitate discharge of solids into said bed.

6. Apparatus as defined in claim 4 wherein said discharge ports in said trays are associated, at least in part, with short downcomers each having its lower ends spaced above the next succeeding tray.

7. In a system circulating granular solids comprising an upright gas lift conduit through which solids are impelled upwardly by lift gas and an enlarged disengager vessel into which said conduit discharges solids and gas, the improvement which comprises: means defining at least two vertically spaced shelves adapted to retain beds of solids thereon within said disengager vessel, at least one of said shelves being located above the discharge outlet of the conduit, the inner edges of the shelves which are located above said discharge outlet being spaced outwardly from the projection of the periphery of the lift conduit and substantially out of the path of the rising solids discharging from said conduit, at least one aperture associated with each of said shelves defining means for passage of solids downwardly therefrom.

8. In a system for circulating granular solids providing an upright gas-lift conduit through which solids are propelled upwardly by lift gas and an enlarged disengager vessel into which said conduit discharges solids and gas the improvement which comprises: means defining at least two vertically spaced shelves adapted to retain beds of solids thereon within said disengager vessel, at least one of said shelves being located above the discharge outlet of the conduit, the inner edges of the shelves which are located above said discharge outlet being spaced outwardly from the projection of the periphery of the lift conduit and substantially out of the path of the rising solids discharging from said conduit, each of said shelves being provided with apertures in the bottom and within the bounds thereof permitting pasage of solids therethrough.

References Cited in the file of this patent

UNITED STATES PATENTS

| | | |
|---|---|---|
| 1,498,630 | Jensen | June 24, 1924 |
| 2,358,497 | Egloff | Sept. 19, 1944 |
| 2,435,927 | Manning | Feb. 10, 1948 |
| 2,449,601 | Gohr | Sept. 21, 1948 |
| 2,550,722 | Rollman | May 1, 1951 |

FOREIGN PATENTS

| | | |
|---|---|---|
| 278,858 | Germany | July 18, 1913 |